E. M. LAWRENCE.
COOKING APPARATUS.
APPLICATION FILED JAN. 17, 1920.
1,350,030.
Patented Aug. 17, 1920.
2 SHEETS—SHEET 1.
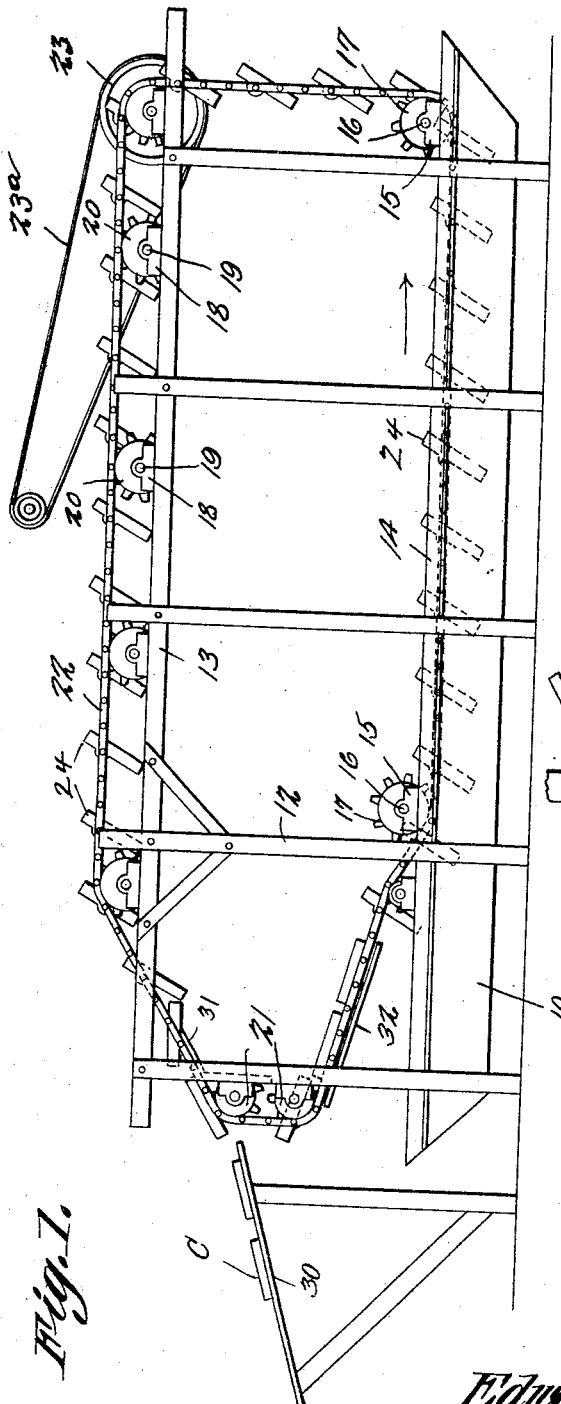
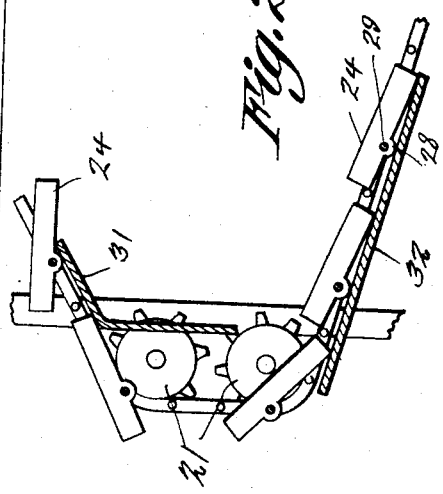
Inventor,
Edward M. Lawrence
Attorneys.

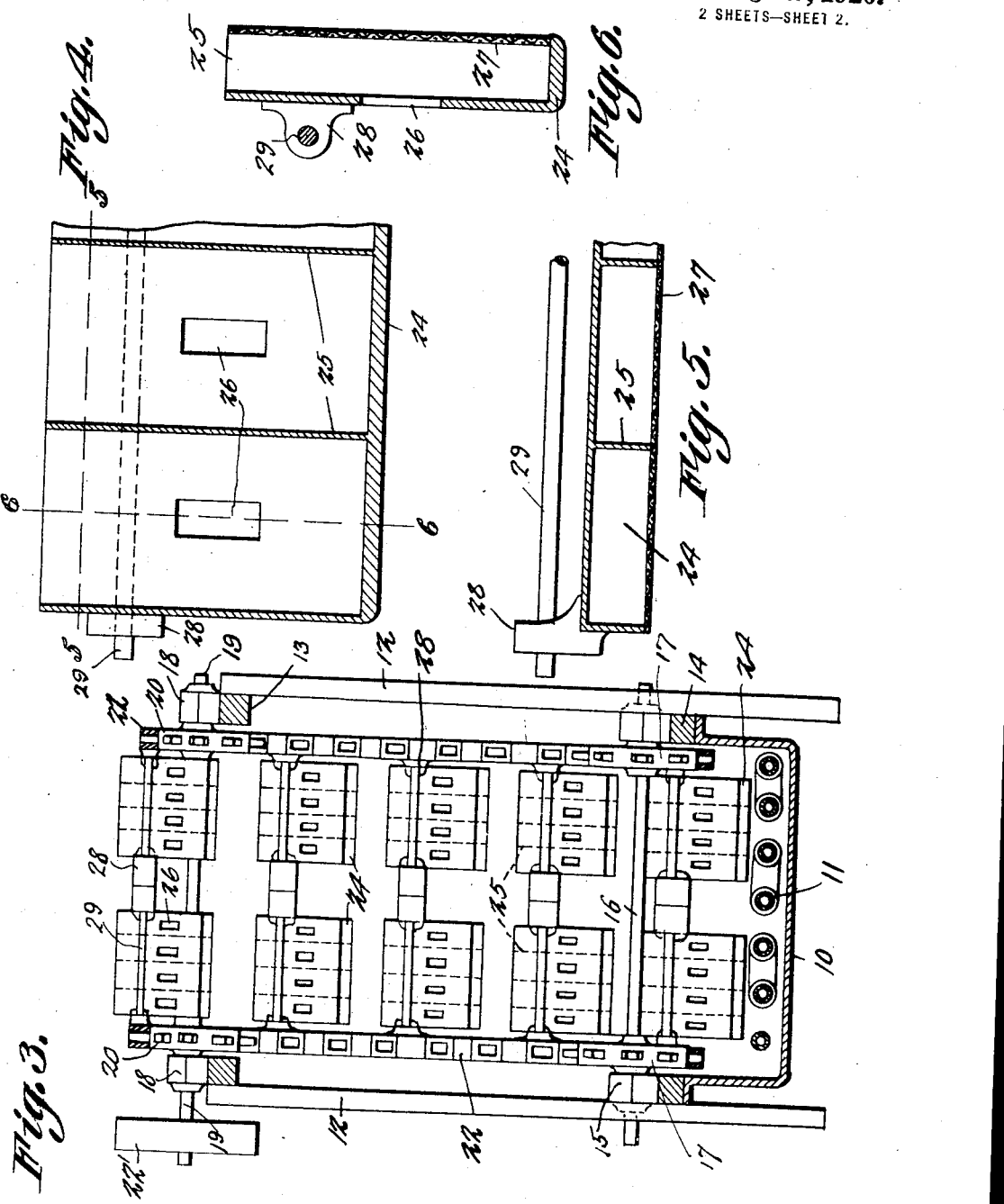

UNITED STATES PATENT OFFICE.

EDWARD M. LAWRENCE, OF ROCKLAND, MAINE.

COOKING APPARATUS.

1,350,030.  Specification of Letters Patent.  Patented Aug. 17, 1920.

Application filed January 17, 1920. Serial No. 352,140.

*To all whom it may concern:*

Be it known that I, EDWARD M. LAWRENCE, a citizen of the United States, residing at Rockland, in the county of Knox and State of Maine, have invented new and useful Improvements in Cooking Apparatus, of which the following is a specification.

This invention relates to apparatus for cooking sardines and other fish, and more particularly an apparatus in which the cooking operation is effected by subjecting the fish to action of hot oil, the fish being placed in a container and carried through a tank containing the hot oil.

The apparatus has been designed for carrying out in a simple and effective manner the process disclosed and claimed in Patent No. 1170762, dated February 8, 1916.

In order that the invention may be better understood, reference is had to the accompanying drawings forming a part of this specification, and in said drawings—

Figure 1 is a side elevation of the apparatus; Fig. 2 is an enlarged sectional detail of the receiving end of the apparatus; Fig. 3 is a cross section of the apparatus; Fig. 4 is a longitudinal section of a fragment of a holder to be hereinafter described; Fig. 5 is a horizontal section on the line 5—5 of Fig. 4, and Fig. 6 is a vertical section on the line 6—6 of Fig. 4.

Referring specifically to the drawings, 10 denotes a tank of suitable depth to hold a supply of oil, the latter being heated by steam coils 11 in the tank, or by any other means immaterial to the present invention. Adjacent to the tank is mounted an upright supporting frame 12 of suitable design having longitudinal top and bottom beams 13 and 14, respectively. The bottom beams may also support the tank 10, and they carry bearings 15 for the shafts 16 of sprocket wheels 17. The top beams carry bearings 18 for the shaft 19 of sprocket wheels 20. At the forward end of the frame are also two vertically spaced sprocket-wheels 21.

The sprocket wheels 17, 20 and 21 support two laterally spaced endless chains 22, which are driven by applying power from any suitable source to one of the top shafts 19. The drawings show the shaft provided with a pulley 23 driven by a belt 23ª.

Between the chains 22, at suitable intervals, are hung holders 24 for the cans containing the fish to be cooked. Each holder is in the form of a receptacle divided by partitions 25 into a plurality of compartments, dimensioned so that each may receive a can of fish. In the rear wall of each compartment is an opening 26, and the front wall is made foraminous by fitting a screen 27 to the open front of the receptacle. The top of the receptacle is open for the reception and the discharge of the cans. On the back of the receptacle, at the ends thereof, are hinge knuckles 28 through which a hinge rod 29 loosely passes, said rod extending between the chains 22 and being fastened thereto at its ends in any suitable manner. The receptacles 24 are therefore pivotally hung on the rods 29, between the chains 22. As shown in Fig. 3, two receptacles are mounted on each rod, but this arrangement is not material, and may be varied as desired.

The pivot of the receptacles 24 is near the top thereof, so that they tend normally to hang downwardly at an oblique angle to the direction of travel of the chains 22.

The structure hereinbefore described forms an endless conveyer which is so positioned relative to the tank 10 that its lower run passes through the tank in the direction of the length thereof.

At the forward end of the apparatus, this being the receiving and also the discharging end, is an inclined table 30 to receive the cans C as they are discharged from the holders 24. Adjacent to the receiving end of the table 30 is a trip device which is in the form of a stationary plate 31 positioned between the chains 22 so as to intercept the pendent holders 24 as they are approaching the table. Below the trip plate 31 is a table 32 which is located just below the chains 22 and extends with a downward incline toward the tank 10. The cans of fish are inserted into the holders 24 when the latter reach the table 32.

In operation, the conveyer is driven at a slow rate of speed so that the holders 24 remain in the hot oil in tank 10 a sufficient length of time to cook the fish. The holders travel through the tank in the direction of the arrow shown in Fig. 1. It will therefore be seen that the foraminous front 27 of each holder faces the direction in which the holder travels through the hot oil. The cans containing the fish are open, and they will be so placed in the respective compartments of the holder that the open portions of the can are back of the foraminous front 27 of the holder. The oil can therefore enter the cans, and any oil entering the holders escapes through the rear openings 26. The holders rise out of the tank 10 at the rear end thereof, and then travel with the upper run of the conveyer back to the receiving end of the apparatus. The holders remain in pendent position until they reach the trip plate 31, and hence the water cooked out of the fish, and the oil gathered up by the cans and the holders is drained and drops back into the tank. By the time the holders reach the trip plate 31, all the oil and water has run out of the cans. When the pendent portion of the holder 24 strikes the trip plate 31 the holder is inverted as shown in Figs. 1 and 2, and the open top of the holder now faces the table 30, and the holder is also inclined toward the latter, so that the cans C slide out of the holder onto the table 30. The discharged cans then slide to an automatic oiler which supplies the proper quantity of cold oil, after which the cans are ready for their covers.

After the holders 24 clear the trip plate 31, they again tilt to assume a pendent position, and referring to Fig. 2, it will be seen that the forward end of the table 32 is so positioned that it intercepts the holders as they swing down upon clearing the trip plate 31, and the holders are thus placed in position for ready access to their open tops for insertion of the cans. The newly filled holders slide down the table 32 and then pass into the tank as before.

By the apparatus hereinbefore described, the sardines can be cooked or fried in the cans in which they are packed for the market, which is a decided advantage as it obviates the handling and packing of the fish after they are cooked, in which state they are very tender and are apt to get more or less bruised or broken when thus packed. It has heretofore been impracticable to cook or fry sardines in the cans in which they are marketed because of the fact that they contain a large percentage of water, and when cooked, the water extracted by the frying process remained in the cans, thereby impairing the taste and flavor of the sardines. However, with the present apparatus, all the water and cooking oil is drained off, and this is done without disturbing the fish in the cans in which they are packed for the market.

I claim:

1. A cooking apparatus comprising an endless conveyer having upper and lower runs, a cooking receptacle through which the lower run of the conveyer passes, pivotally supported article-container holders carried by the conveyer, said holders having an open top and a foraminous front, against which latter open portions of the article-containers are adapted to seat, the pivots of the holders being so located that said holders have a normal tendency to pendent position on the upper and lower runs of the conveyer, and means interposed in the paths of the holders to invert the same at one end of the upper run of the conveyer to dump the article-containers from the open tops of the holders.

2. A cooking apparatus comprising an endless conveyer having upper and lower runs, a cooking receptacle through which the lower run of the conveyer passes, pivoted supported article-container holders carried by the conveyer, said holders having an open top and a foraminous front, against which latter open portions of the article-containers are adapted to seat, the pivots of the holders being so located that said holders have a normal tendency to pendent position on and at an oblique angle to the upper and lower runs of the conveyer, and means interposed in the paths of the holders to invert the same at one end of the upper run of the conveyer to dump the article-containers from the open tops of the holders.

3. A cooking apparatus comprising an endless conveyer having upper and lower runs, a cooking receptacle through which the lower run of the conveyer passes, pivotally supported article-container holders carried by the conveyer, said holders having an open top and a foraminous front, against which the latter open portions of the article-containers are adapted to seat, the pivots of the holders being so located that said holders have a normal tendency to pendent position on the upper and lower runs of the conveyer, means interposed in the paths of the holder to invert the same at one end of the upper run of the conveyer to dump the article-containers from the open tops of the holders, and an inclined table in the path of the dumped article-containers to receive the same.

4. A cooking apparatus comprising an endless conveyer having upper and lower runs, a cooking receptacle through which the lower run of the conveyer passes, pivotally supported article-container holders carried by the conveyer, said holders having an open top and a foraminous front, against which latter open portions of the article-containers are adapted to seat, the pivots of the holders being so located that said holders have a normal tendency to pendent position on the upper and lower runs of the conveyer, means interposed in the paths of the holders to invert the same at one end of the upper run of the conveyer to dump the article-containers from the open tops of the holders, and a receiver for the dumped article-containers positioned in the path thereof.

5. A cooking apparatus comprising an endless conveyer having upper and lower runs, a cooking receptacle through which the lower run of the conveyer passes, and article-container holders carried by the conveyer and having a foraminous front, against which latter open portions of the article-containers are adapted to seat, said holders having a pendent position on the upper run of the conveyer, and the foraminous front being inclined on said upper run to drain into the cooking receptacle.

In testimony whereof I affix my signature.

EDWARD M. LAWRENCE.